United States Patent
Delany (10) Patent No.: US 11,786,091 B2
(45) Date of Patent: Oct. 17, 2023

(54) VACUUM GRINDER CLEANING DEVICE AND METHOD

(71) Applicant: Dennis M. Delany, Lancaster, PA (US)

(72) Inventor: Dennis M. Delany, Lancaster, PA (US)

( * ) Notice: Subject to any disclaimer, the term of this patent is extended or adjusted under 35 U.S.C. 154(b) by 130 days.

(21) Appl. No.: 17/226,569

(22) Filed: Apr. 9, 2021

(65) Prior Publication Data

US 2022/0322898 A1 Oct. 13, 2022

(51) Int. Cl.
*A47L 9/02* (2006.01)
*A47L 7/00* (2006.01)

(52) U.S. Cl.
CPC ............... *A47L 9/02* (2013.01); *A47L 7/0052* (2013.01)

(58) Field of Classification Search
CPC .................................. A47L 9/02; A47L 7/0052
See application file for complete search history.

(56) References Cited

U.S. PATENT DOCUMENTS

| | | | | |
|---|---|---|---|---|
| 3,128,051 A * | 4/1964 | Smith | ................. | F04D 29/2288 241/245 |
| 4,153,968 A * | 5/1979 | Perkins | ................... | B01F 23/45 15/321 |
| 4,488,330 A * | 12/1984 | Grave | ................. | A47L 11/4044 15/322 |
| 5,011,370 A * | 4/1991 | Sodergard | ............... | F04D 7/045 415/121.1 |
| 5,555,597 A * | 9/1996 | Berfield | ............... | A47L 11/4044 15/328 |
| 6,453,507 B1 * | 9/2002 | Gilbert | ................... | A47L 7/0028 15/353 |
| 8,074,911 B2 * | 12/2011 | Capano | ............... | F04D 15/0218 73/290 R |
| 10,588,476 B2 * | 3/2020 | Royale | ................ | A47L 11/4016 |
| 2014/0130327 A1 * | 5/2014 | Theising | ................ | A01G 3/002 15/246.2 |
| 2019/0353156 A1 * | 11/2019 | Ward | ...................... | F04D 13/08 |

* cited by examiner

*Primary Examiner* — Anne M Kozak
*Assistant Examiner* — Christopher Soto
(74) *Attorney, Agent, or Firm* — Saxton & Stump, LLC (57) ABSTRACT

An apparatus for removing large particles from a vessel The apparatus includes a vacuum storage container and a suction hose extending from the vacuum storage container. The vacuum storage container includes a material receiving section, a grinding pump and a disposal line. The material receiving section receives the large particles from the suction hose. The grinding pump is positioned in the material receiving section for pulverizing the large particles received in the material receiving section. The disposal line extends from the grinding pump through the vacuum storage container to remove the pulverized material from the grinding pump and the vacuum storage container.

20 Claims, 8 Drawing Sheets

VACUUM GRINDER CLEANING DEVICE AND METHOD

FIELD OF THE INVENTION

The present invention relates to a cleaning device and method for removing unwanted material from processing equipment or devices. In particular, the invention is directed to a cleaning device and method which utilizes a vacuum and a grinder pump to remove the unwanted material.

BACKGROUND OF THE INVENTION

In many manufacturing processes, materials, whether liquid or solid, must be delivered from a holding tank or hopper to processing equipment, such as a mixer. The finished materials may then be moved to large storage tanks. As the material is delivered to the processing equipment and/or the storage tanks by means of pipes or conduits, the material often passes through screen or filters to remove any unwanted materials or contaminants. However, over time, the screens or filters may become ineffective or clogged by the accumulated material, which results in the screens or filters becoming ineffective. Currently, the screens are cleaned manually by someone having access to or entering the equipment to physically remove the accumulated material. This process is time consuming, inefficient, and costly.

It would, therefore, be beneficial to provide a cleaning device and method which can be used to clean screens/filters and remove unwanted material or waste from processing equipment. It would also be beneficial to grind the unwanted material or waste into fine particles which can be deposited in waste water drains.

SUMMARY OF THE INVENTION

An embodiment is directed to a portable or fixed apparatus for removing large particles from a vessel. The apparatus includes a vacuum storage container and a suction hose extending from the vacuum storage container. The vacuum storage container includes a material receiving section, a grinding pump and a disposal line. The material receiving section receives the large particles from the suction hose. The grinding pump is positioned in the material receiving section for pulverizing the large particles received in the material receiving section. The disposal line extends from the grinding pump through the vacuum storage container to remove the pulverized material from the grinding pump and the vacuum storage container.

An embodiment is directed to a portable or fixed apparatus for removing large particles from a vessel. The apparatus includes a vacuum storage container with a material receiving section, a grinding pump and a disposal line. A suction hose extends from the vacuum storage container. The apparatus includes a cleaning system. The cleaning system flushes the suction hose and the vacuum storage container as desired.

An embodiment is directed to a method for removing large particles from a vessel. The method includes: vacuuming the particles into a vacuum storage container; pulverizing the particles in a grinding pump in the vacuum storage container; and discharging the pulverized particles though a disposal line extending from the grinding pump through the vacuum storage container.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 1:
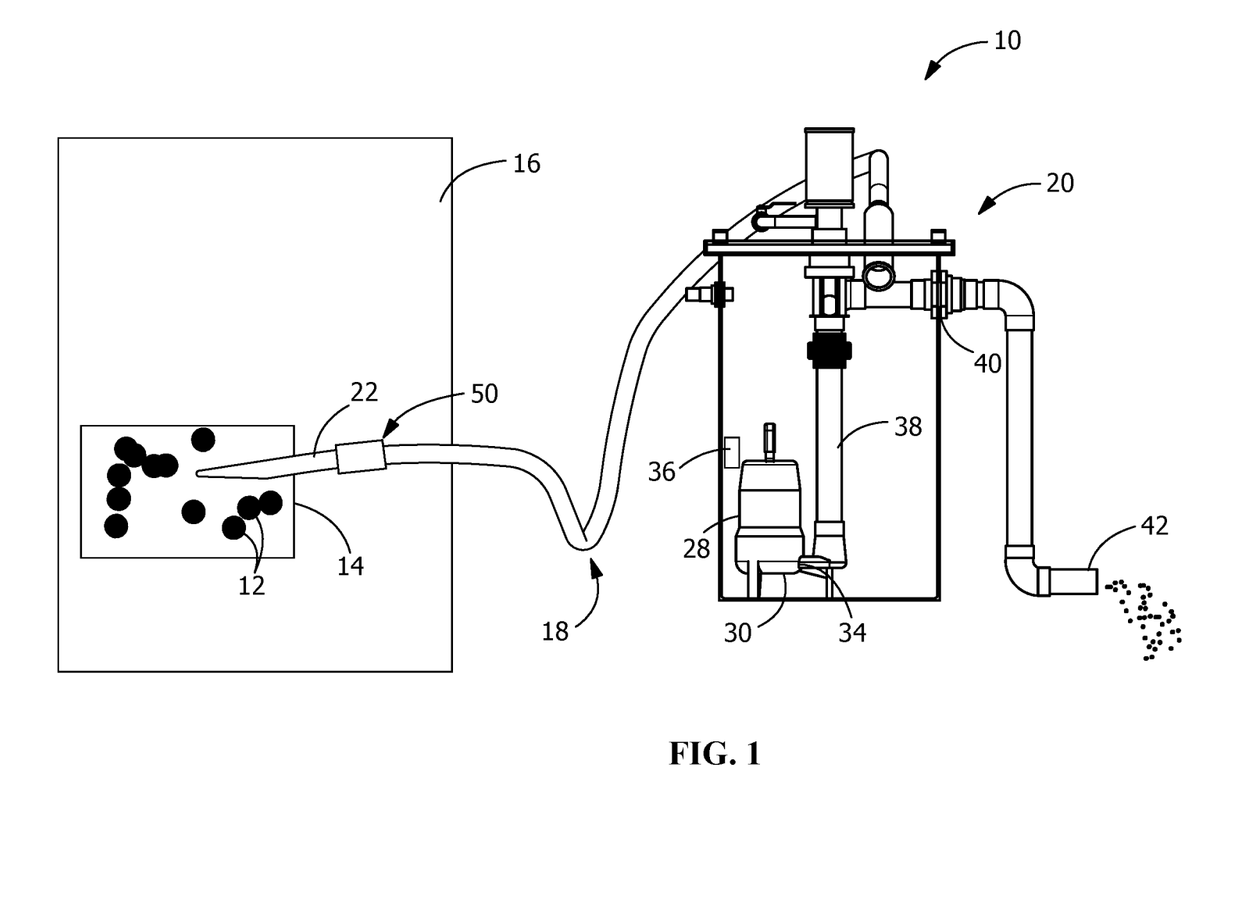
FIG. 1 is a diagrammatic view of an illustrative environment in which a cleaning device or apparatus of the present invention is used. The cleaning device or apparatus is used in conjunction with a vessel in which large particles accumulate.

As shown in FIG. 1, a vacuum and grinding system or device 10 can be used to remove large particles 12, which may be contained in a liquid, from screens or filters 14 of vessels 16, such as, but not limited to, processing equipment. The vacuum and grinding system or device 10 includes a suction hose 18 and a vacuum storage container 20. The vacuum and grinding system or device 10 may operate either with either air or electric.

The suction hose 18 may be made from materials having the appropriate strength and flexibility characteristics, such as, but not limited to, stainless steel, mild steel, Polyvinylchloride (PVC), PVC Laminate Polyester, PVC reinforced with a wire helix, or rubber. The length and diameter of the suction hose 18 may vary depending upon the particular application and the size of the particles 12 which must be removed. However, the diameter of the suction hose 18 must be larger than the diameter of the largest particle 12 which must be removed by the suction hose 18.

In the illustrative embodiment shown, the suction hose 18 has a suction wand 22 that is provided at an end of the suction hose 18 which is removed from the vacuum storage container 20. The suction wand 22 may be attached to the suction hose 18 by various known methods, including, but not limited to, friction, mounting adhesives or mounting hardware. The suction wand 22 may be made from any material having the appropriate strength characteristics, such as, but not limited to, stainless steel, mild steel, aluminum, black oxide, PVC, or rubber. The length and diameter of the suction wand 22 may vary depending upon the particular application and the size of the particles 12 which must be removed. However, the diameter of the suction wand 22 must be larger than the diameter of the largest particle 12 which must be removed by the suction hose 18.

Figure 2:
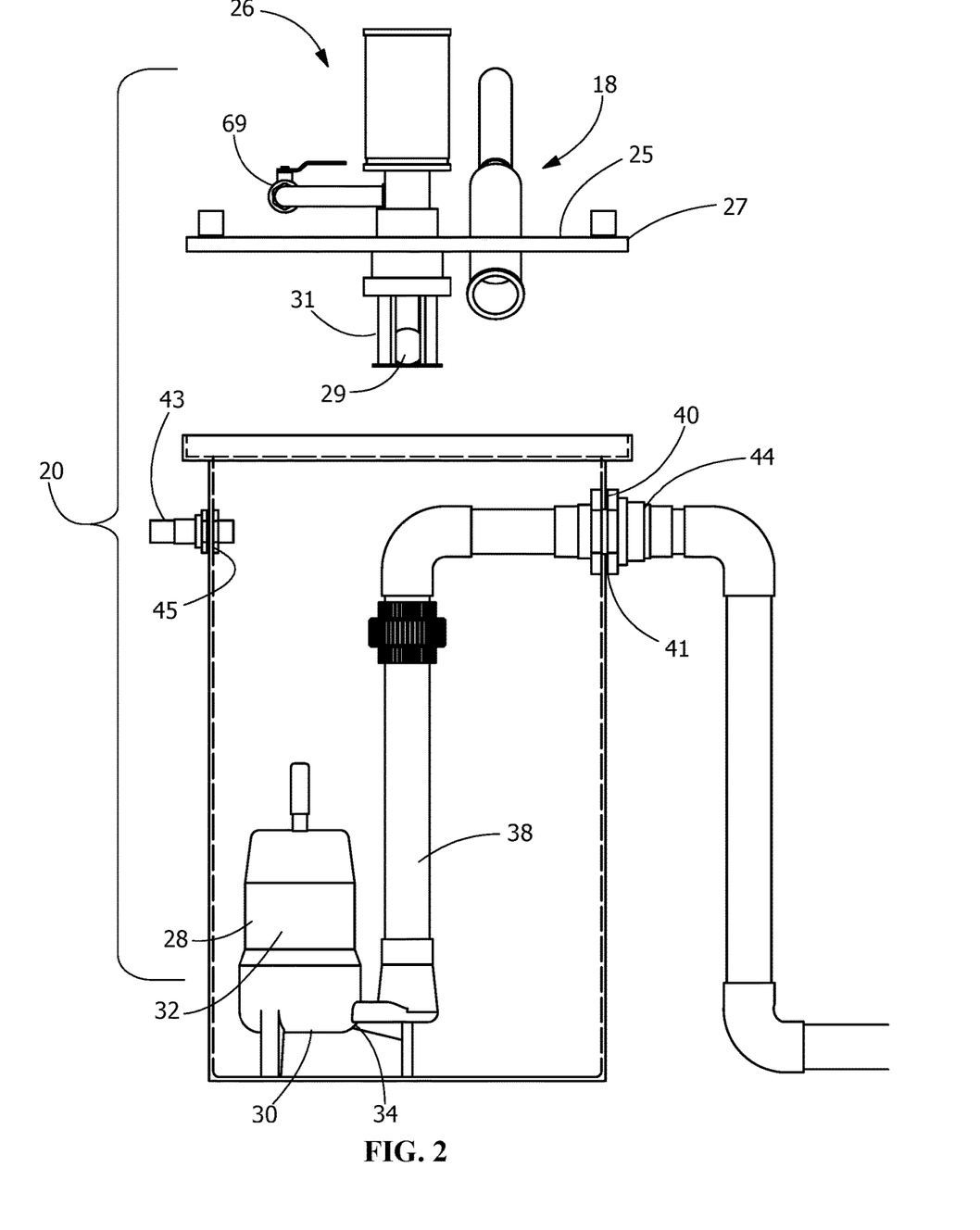
FIG. 2 is an exploded front view of an illustrative vacuum storage container according to the present invention. The walls of the device are shown as translucent to better shown the components of the device.
Figure 3:
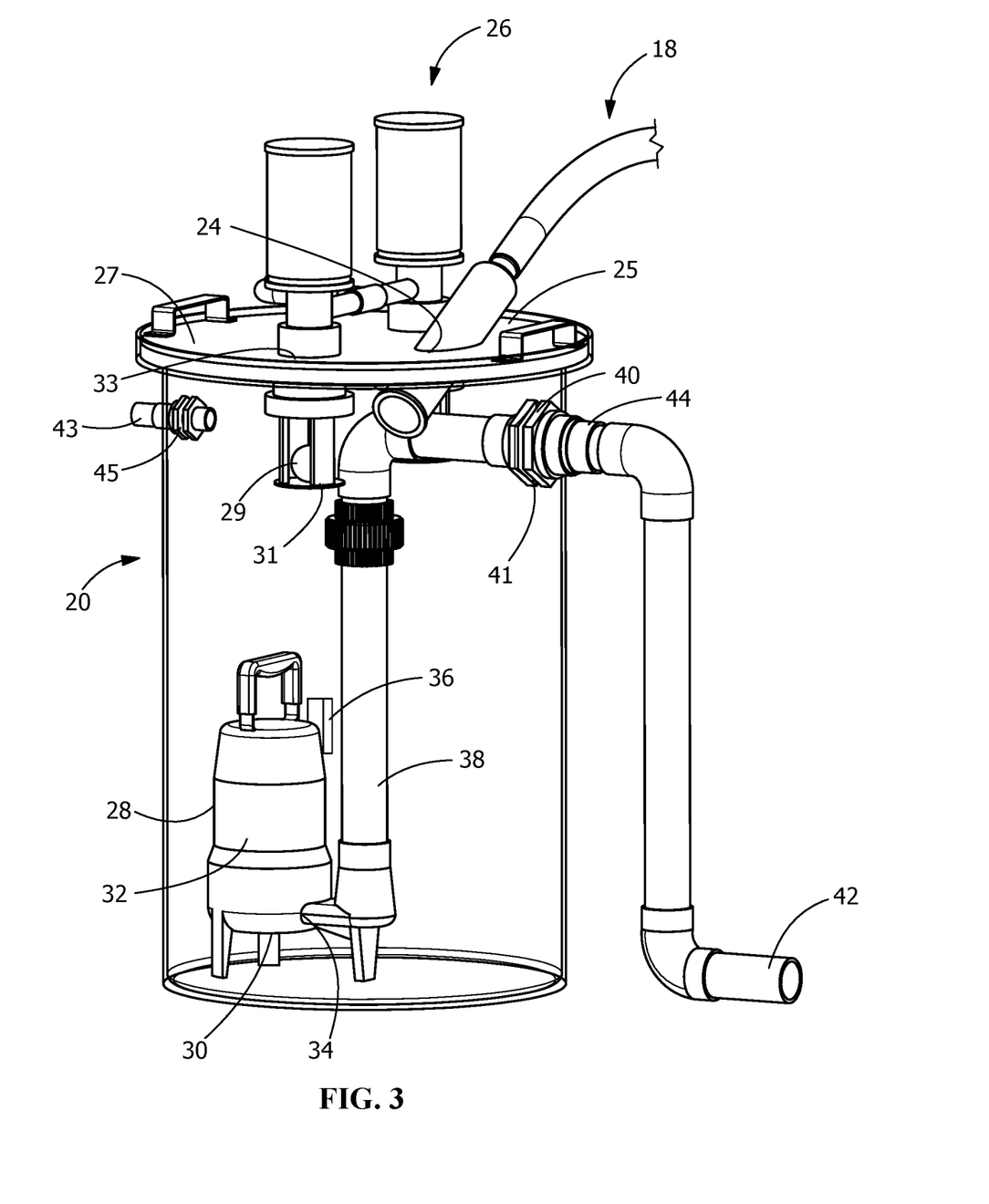
FIG. 3 is an assembled perspective view the vacuum storage container of FIG. 2. The walls of the device are shown as translucent to better shown the components of the device.

The vacuum storage container 20, as shown in FIGS. 2 and 3, is dimensioned to receive the large particles 12 which have been removed from the vessel 16 and moved to the vacuum storage container 20 through the suction hose 18. The suction hose 18 enters the vacuum storage container 20 through a suction hose opening 24 (FIG. 3). The suction hose opening 24 is dimensioned to have approximately the same diameter as the suction hose 18, thereby allowing a tight fit or seal between the suction hose opening 24 of the vacuum storage container 20 and the suction hose 18. The seal between the suction hose opening 24 and the suction hose 18 may be enhanced by a seal (not shown) made of material with the appropriate elastic characteristics, such as, but not limited to rubber.

The vacuum storage container 20 may be made from materials having the appropriate strength characteristics, including, but not limited to, stainless steel, mild steel and PVC. The vacuum storage container 20 includes one or more vacuum motors 26 which are used to generate the air flow or vacuum needed to remove or vacuum the particles 12 from the vessel 16 through the suction hose 18. In the illustrative embodiment shown, the motor 26 is positioned outside the vacuum storage container 20 on a top surface 25 of a lid 27 of the vacuum storage container 20. However, the vacuum motor 26 may be positioned in other locations. The motor can be any motor which can generate sufficient air flow to vacuum the particles 12. The motor 26 may be, but is not limited to, electric or air driven 69.

One or more ball floats 29 and ball float cages 31 extend from the vacuum motor 26 through openings 33 in the top surface 25 of the vacuum storage container 20. The ball float cages 31 and ball floats 29 extend in the vacuum storage container 20 in a space above a grinding pump 28. The ball float(s) 29 is to rise on high level to seal and protect the vacuum motor(s) by not allowing any more product flow into the vacuum storage container 20.

The grinding pump 28 is provided in the vacuum storage container 20. The grinding pump 28 is located in a lower portion of the vacuum storage container 20. The grinding pump 28 has an intake opening 30, a grinding section 32 and an output opening 34. In the illustrative embodiment shown, the intake opening 30 is provided proximate a bottom of the grinding pump 28. The output opening 34 is provided proximate a bottom side of the grinding pump 28. The grinding section 32 is provided between the intake opening 30 and the output opening 34. The grinding section 32 contains blades (not shown) or other devices which interact with the particles 12 to grind or pulverize the particles 12 into small particles which can be discharged into a waste basin. The grinding pump 28 may be made from various materials, including, but not limited to stainless steel, mild steel or PVC. The grinding pump 28 may be sized according to need. As example of a grinding pump 28 is 1 Hp Residential 2" Grinding Pump with Piggyback Tether Float made by ProVore Pump.

A vessel float 36 is provided on or proximate the grinding pump 28. The vessel float 36 is movable between a first or lowered position and a second or raised position. When there is little or no particles 12 or liquid provided in the vacuum storage container 20, the vessel float 36 is initial or lowered position. In this lowered position, the vessel float 36 cooperates with the grinding pump 28 to place the grinding pump 28 in the off position. When there is sufficient particles 12 or liquid provided in the vacuum storage container 20 such that the surface of the particles 12 or liquid is above the grinding pump 28, the vessel float 36 is moved to the raised position. In this raised position, the vessel float 36 cooperates with the grinding pump 28 to place the grinding pump 28 in the on or operational position. The cooperation of the vessel float 36 with the grinding pump 28 allows for the automatic grinding of the particles 12 when needed.

A disposal line 38 extends from the output opening 34 of the grinding pump 28 and through a disposal line opening 40. The disposal line opening 40 is dimensioned to have approximately the same diameter as the disposal line 38, thereby allowing a tight fit or seal between the disposal line opening 40 of the vacuum storage container 20 and the disposal line 38. The seal between the disposal line opening 40 and the disposal line 38 may be enhanced by securing hardware 41 and a seal (not shown) made of material with the appropriate elastic characteristics, such as, but not limited to rubber. An end 42 of the disposal line 38 deposits the pulverized material in a waste bin or the like. The disposal line 38 may include a check valve 44 to eliminated back flush into the vacuum storage container 20.

A rinse line 43 extends into the vacuum storage container 20 through a fluid input opening 45 of the vacuum storage container 20 to assist in cleaning (manually or automatically) the vacuum storage container 20, the grinding pump 28 and the disposal line 38. The rinse line 43 is positioned below the top surface 25 of the vacuum storage container 20 and below the vacuum motor 26.

A cleaning system (manual or automatic) may be included on the vacuum and grinding system or device 10. In the embodiment shown, a rinse valve 71, in conjunction with the rinse line 43, is provided on the fluid input opening 45. The rinse valve 71 is used to flush the vacuum storage container 20, the grinding pump 28 and the disposal line 38 with water or any other type of cleaning fluid during and/or after the vacuuming is completed. In the automatic sequence, the rinse valve 71 will add fluid 68 until the vessel float 36 is in the raised position to activate the grinder pump 28 and to turn off the rinse valve 71. Once the vessel float 36 is in the lowered position, the grinder pump 28 turns off. This may occur several times.

Figure 4:
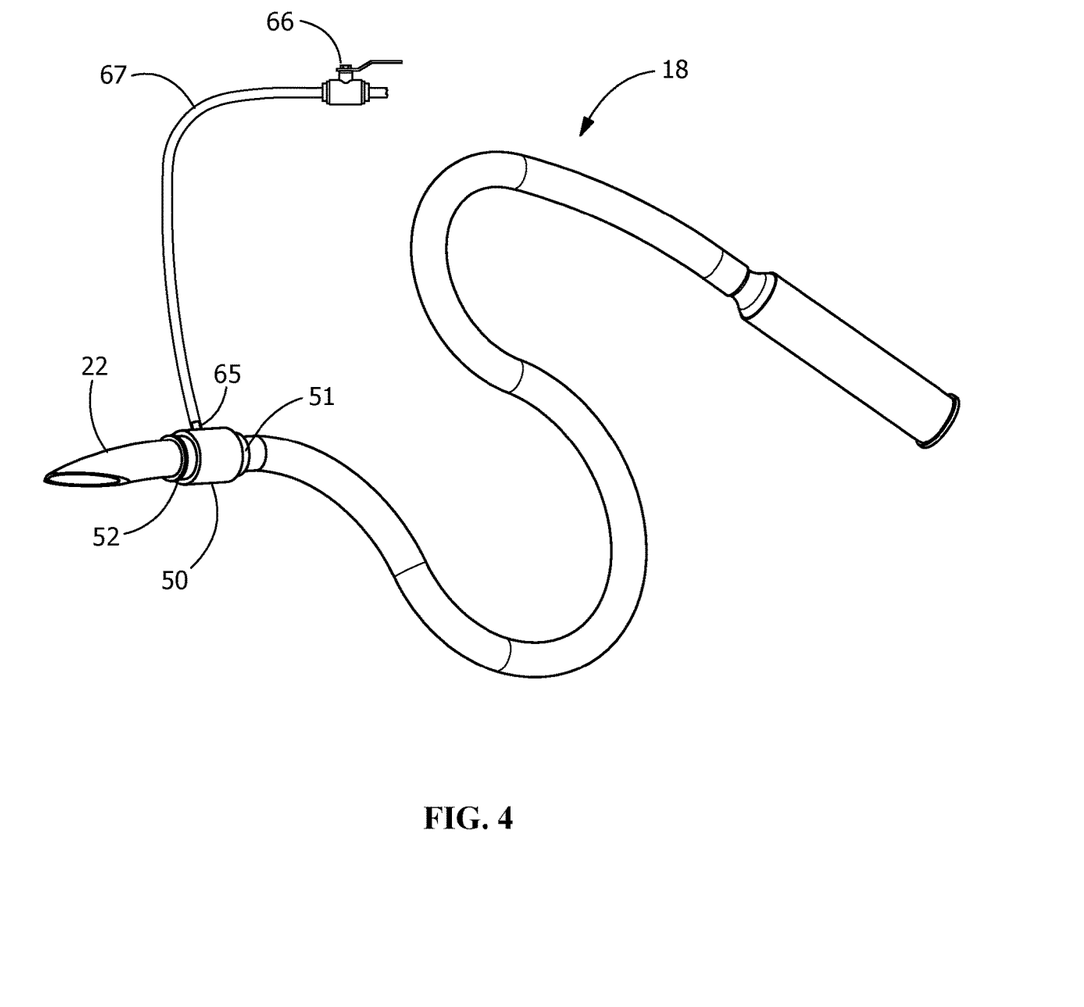
FIG. 4 is a perspective view of an illustrative suction hose of the present invention with a fitting for a cleaning system attached.

A cleaning system (manual or automatic) may be included on the suction hose 18. In the embodiment shown, a fitting 50, in conjunction with the fluid line 67, is provided on the suction hose 18. The fitting 50 is used to flush the suction hose 18, the vacuum storage container 20, the grinding pump 28 and the disposal line 38 with water or any other type of cleaning fluid.

Referring to FIGS. 4 through 7, the illustrative pipe fitting 50 is shown. The pipe fitting is more fully disclosed in co-pending U.S. patent application Ser. No. 17/075,331, filed on Oct. 21, 2020, which is hereby incorporated by reference in its entirety.

Figure 5:
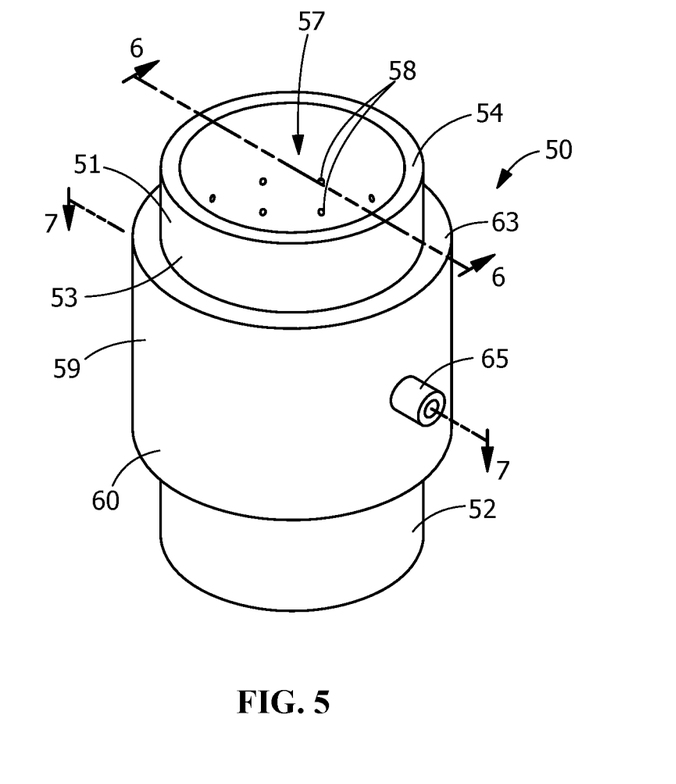
FIG. 5 is a perspective view of an illustrative embodiment of the fitting of FIG. 4, which may be attached to the suction hose.
Figure 6:
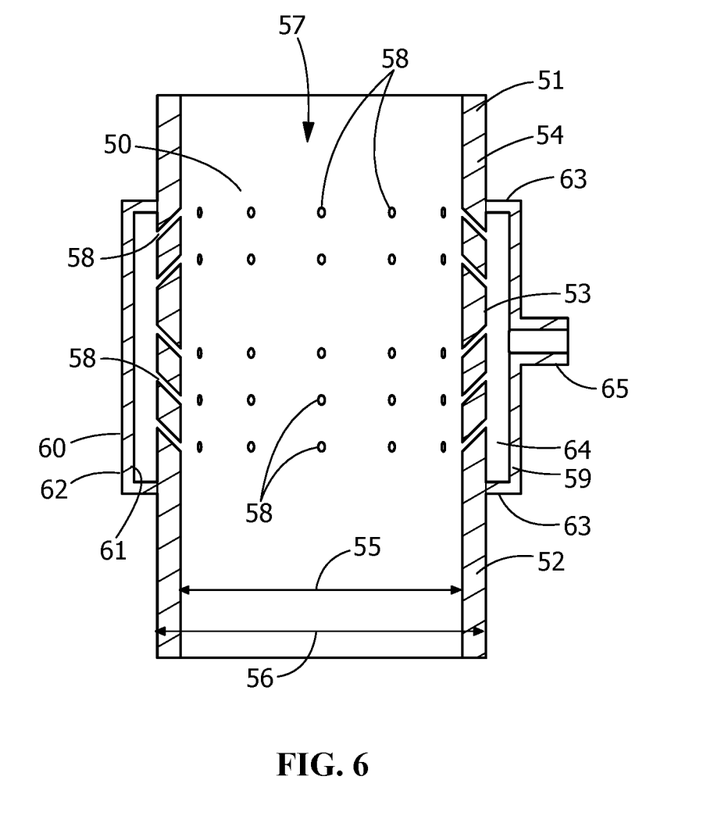
FIG. 6 is a cross-sectional view of the fitting, taken along line 6-6 of FIG. 5.

The pipe fitting 50 has a first end portion 51, a second end portion 52, and a perforated middle portion 53 which extends between the first end portion 51 and the second end portion 52. The pipe fitting 50 has a generally cylindrical configuration with a side wall 54 extending about the circumference of the pipe fitting 50. As shown in FIG. 6, the side wall 54 has an inner diameter 55 and an outer diameter 56. In the illustrative embodiment shown, the inner diameter 55 and the outer diameter 56 of the side wall 54 is consistent across the first end portion 51, the second end portion 52 and the perforated portion 53. However, in other embodiments the inner diameter 55 and/or the outer diameter 56 of the side wall 54 may vary across the first end portion 51, the second end portion 52 and/or the perforated portion 53. The inner diameter 55 defines a material flow passageway 57.

The perforated portion 53 has multiple openings 58 which extend through the side wall 54 from the inner diameter 55 to the outer diameter 56. The openings 58 in each pipe fitting 50 are generally consistent. The preferred diameter of the openings 58 for a particular pipe fitting 50 is determined based on many variables, including, but not limited to, the size of the pipe fitting, the amount and the type of material which flows through the material flow passageway 57, and/or the type of cleaning fluid used.

The perforated portion 53 has a fluid receiving flange or member 59 which extends from and integrally attached to the side wall 54 of the perforated portion 53. The fluid receiving member 59 has an outer wall 60 with an inner surface 61 and an outer surface 62. End walls 63 extend from the inner surface 61 of the outer wall 60 in a direction away from the outer surface 62. The end walls 63 engage are integrally attached to the side wall 54. The outer wall 60 is spaced from the side wall 54 to form a fluid receiving cavity 64 therebetween.

One or more ports 65 extend through the outer wall 60 and into the fluid receiving cavity 64. Each port 65 is configured to allow fluid, such as, but not limited to, air or water, to flow through the port 65 and into the fluid receiving cavity 64 when a flexible or rigid hose 67 is attached to the port 65 and a valve 66 (FIG. 8) is opened manually or automatically.

The fluid receiving cavity 64 extends about the entire circumference of the perforated portion 53. Each of the openings 58 has an end which opens into the fluid receiving cavity 64.

In the illustrative embodiment, the pipe fitting 50 has the first end portion 51 attached to the suction hose 18 using known methods or devices of attachment, such as, but not limited to, adhesive, threads or a clamp. The second end portion 52 of the pipe fitting 50 is attached to the suction wand 22.

In use, material flows from the vessel 16 through the suction wand 22, through the suction hose 18 and into the vacuum storage container 20. Material generally passes through the vacuum and grinding system or device 10 freely, as no blockage or restriction is provided. However, occasionally material may accumulate to cause a blockage that may materialize in the vacuum and grinding system or device 10.

The accumulation of material results in the pathway in the suction hose 18 or the vacuum storage container 20 being blocked or restricted. Any such restriction prevents the proper suction of the particles 12 from the vessel 16. It is, therefore, important to provide a device and method for keeping the pathway free of significant accumulation of material. The use of the pipe fitting 50 will prevent the significant accumulation of material in the vacuum and grinding system or device 10.

As shown in FIGS. 1 and 4, the pipe fitting 50 is positioned on the suction hose 18. The one or more ports 65 are connected to a fluid supply source or valve 66 by the hose 67 or other delivery mechanism. The fluid 68 supplied by the fluid supply device 66 may be a liquid, such as water, or a gas such as air. The fluid supply device 66 may be a valve, compressor, a pump or other known device which can deliver the fluid to the ports 65 and the pipe fitting 50 under pressure. The pressure may be varied depending upon many variables, including, but not limited to, the size of the vacuum and grinding system or device 10, the size of the hose or conduit 67, the type of the particles 12 being removed from the vessel 16.

Figure 7:
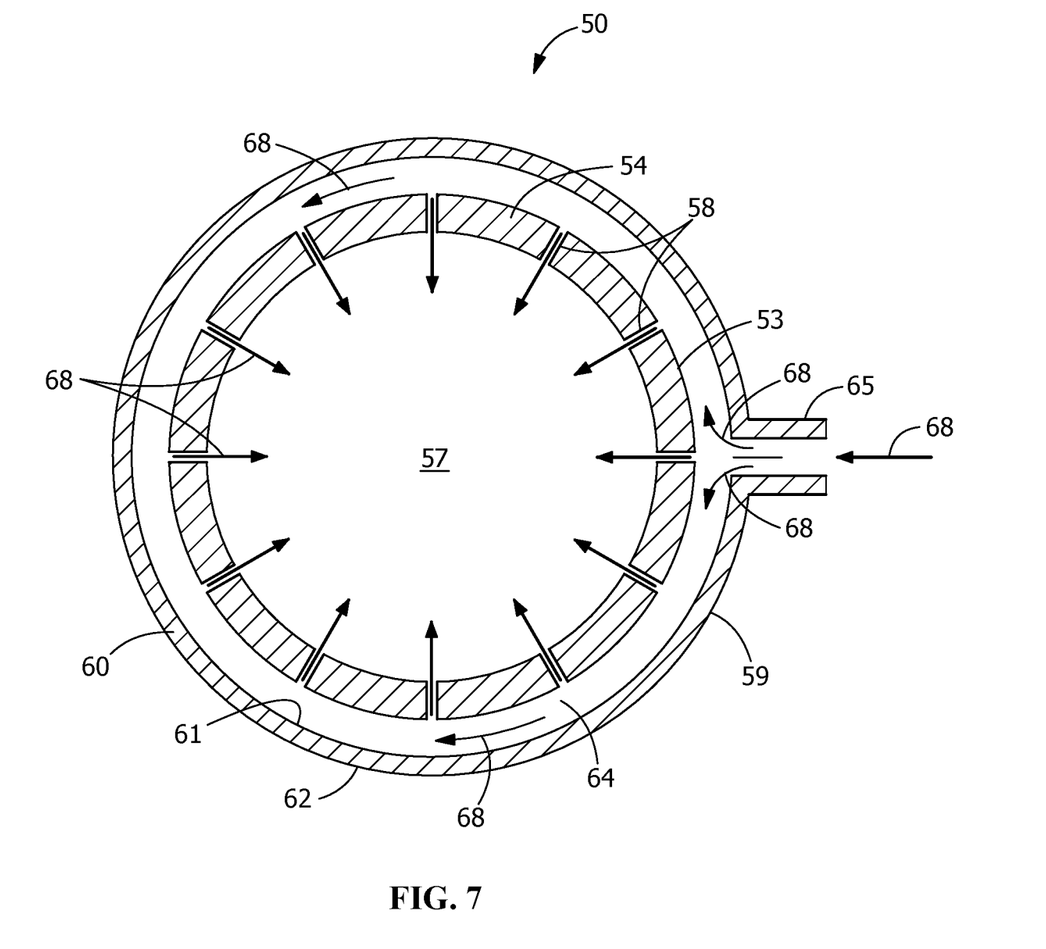
FIG. 7 is a cross-sectional view of the fitting, taken along line 7-7 of FIG. 5, showing the movement a cleaning fluid in the pipe fitting.

As desired or at periodic times or intervals, the ports 65 are opened to allow the pressurized fluid 68, as represented by the arrows 68 in FIG. 7, to move through the ports 65, into the fluid receiving cavity 64, through the openings 58 in the perforated portion 53 of the pipe fitting 50 and into the material flow passageway 57 of the suction hose 18. As the fluid 68 is pressurized as it enters the ports 65, and as the size of the fluid receiving cavity 64 and the openings 58 are controlled, the fluid 68 entering the material flow passageway 57 interacts with any blockage or restriction in the suction hose 18 or the vacuum and grinding system or device 10 to break down the blockage or restriction (not shown) and cause the material forming the blockage or restriction to freely flow into the vacuum storage container 20 and the grinding pump 28.

In order to prevent significant blockages or restrictions, the ports 65 may be opened one or more times as the particles 12 flow through the suction hose 18 to allow the fluid 68 to interact and clean any restrictions that may be forming. In so doing, any blockages or restrictions are prevented. In other embodiments, the ports 65 are retained in the open position during the operation of the suction hose 18 to allow the fluid 68 to move through the suction hose 18 continuously as the suction hose 18 and the vacuum motor 26 are operated.

Figure 8:
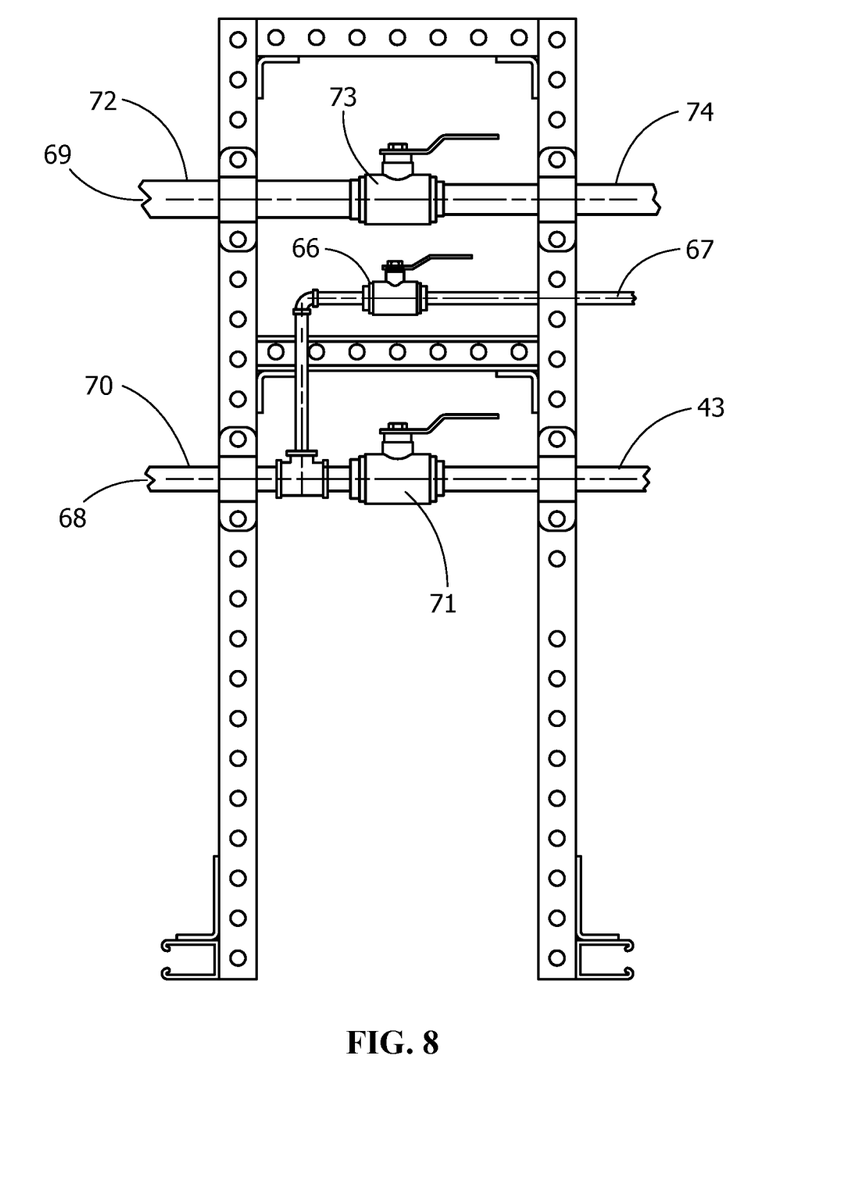
FIG. 8 is a front view of a rack with valves which control the air and the water which facilitate the operation of the cleaning device or apparatus

As shown in FIG. 8, the fluid 68 enters through a fluid intake line 70. The fluid 68 is directed to the hose 67 when the valve 66 is opened. Alternatively, or simultaneously, the fluid 68 or a portion of the fluid is directed to the rinse line 43 when the valve 71 is opened.

Also as shown in FIG. 8, if the vacuum motor 26 is air driven, the flow of air 69 is delivered to the motor by air intake line 72. The amount of air flow is controlled by valve 73.

In operation, as the removal of the particles 12 from the vessel 16 is conducted through the suction hose 18, over filling of the vacuum storage container 20 is prevented by the ball float 29. If too much mixture of fluid 68 and particles 12 is moved to the vacuum storage container 20 by the suction hose 18, the liquid in the vacuum storage container 20 will cause the ball float 29 to rise, causing the vacuum motor 26 to turn off. When the mixture of fluid 68 and particles 12 is removed by the grinding pump 28, the level of the mixture of fluid 68 and particles 12 drops, allowing the ball float 29 to drop, which in turn allows the vacuum motor 26 to turn on and the suction hose 18 to resume removal of the particles 12.

When all of the particles 12 are properly removed from the vessel 16 through the suction hose 18, the vacuum motor 26 continues to operate of a limited time in order to allow the suction hose 18 to be cleaned. After a defined time, the vacuum motor 26 and the suction through the suction hose 18 are stopped. Simultaneously, or proximate in time, to the vacuum motor 26 being turned off, fluid is diverted from the suction hose 18 to the rinse line 43.

Fluid enters the vacuum storage container 20 through the rinse line 43. The fluid flows into the vacuum storage container 20 to fill the vacuum storage container 20 past the level of the vessel float 36 to allow the grinding pump 28 to operate. The input of fluid is stopped and the grinding pump 28 is engaged. This allows the fluid to move through the grinding pump 28 to clean grinding pump 28 after all the particles 12 have been ground. This prevents the accumulation of unwanted material in the grinding pump 28 and the vacuum storage container 20. The process of filling the vacuum storage container 20 with fluid from the rinse line 43 may be repeated several times to properly clean the grinding pump 28 and the vacuum storage container 20.

The vacuum and grinding system or device 10 allows large particles 12 to be removed from the vessels 16 without the need for an operator to enter the vessel 16. The suction wand 22 reaches the large particles 12 and removes them via the vacuum and grinding system or device 10. This eliminate the need for a confined space permit to be obtained. In addition, the use of the grinding pump 28 pulverizes the large particles 12, facilitating the ease of disposing of the waste. The ease of use and efficiency of the vacuum and grinding system or device 10 may also be facilitated by the cleaning system which prevents blockages in the vacuum and grinding system or device 10.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An apparatus for removing large particles from a vessel, the apparatus comprising:
   a vacuum storage container;
   a suction hose extending from the vacuum storage container;
   the vacuum storage container comprising:
   a material receiving section for receiving the large particles from the suction hose;
   a grinding pump positioned in the material receiving section for pulverizing the large particles received in the material receiving section;
   a disposal line extending from the grinding pump through the vacuum storage container to remove the pulverized material from the grinding pump and the vacuum storage container; and
   an automatic cleaning system configured to flush the suction hose and the vacuum storage container, including the material receiving section, the grinding pump and the disposal line;
   wherein the automatic cleaning system includes a fitting, the fitting comprising;
   a first end portion, a second end portion and a perforated portion extending between the first end portion and the second end portion;
   the perforated portion having an inner side wall and outer wall spaced from the inner side wall, a fluid receiving cavity extending between the inner side wall and the outer wall, the inner side wall defining a material flow passageway;
   openings provided in the inner side wall of the perforated portion, the openings having ends which open into the fluid receiving cavity;
   a port extending through the outer wall and into the fluid receiving cavity; and
   a fluid delivery mechanism for delivering pressurized fluid to the port;
   wherein the fluid enters the port and flows through the fluid receiving cavity and through the openings into the material flow passageway to clear any material restrictions.

2. The apparatus as recited in claim 1, wherein a suction wand is provided at an end of the suction hose.

3. The apparatus as recited in claim 1, wherein a vessel float is provided in the material receiving section, and the vessel float communicates with the grinding pump to turn the grinding pump on and off.

4. The apparatus as recited in claim 1, wherein a check valve is provided in the disposal line to eliminate back flush into the grinding pump and the vacuum storage container.

5. The apparatus as recited in claim 1, wherein the fitting is positioned proximate the end of the suction hose which is removed from the vacuum storage container.

6. An apparatus for removing large particles from a vessel, the apparatus comprising:
   a vacuum storage container having a material receiving section, a grinding pump and a disposal line;
   a suction hose extending from the vacuum storage container; and
   a cleaning system, wherein the cleaning system is configured to flush the suction hose and the vacuum storage container;
   wherein the cleaning system includes a fitting, the fitting comprising:
   a perforated portion extending between a first end portion and a second end portion;
   the perforated portion having an inner side wall and outer wall spaced from the inner side wall, a fluid receiving cavity extending between the inner side wall and the outer wall, the inner side wall defining a material flow passageway;

openings provided in the inner side wall of the perforated portion, the openings having ends which open into the fluid receiving cavity;

a port extending through the outer wall and into the fluid receiving cavity; and a fluid delivery mechanism for delivering pressurized fluid to the port.

7. The apparatus as recited in claim 6, wherein the fitting is positioned proximate an end of the suction hose which is removed from the vacuum storage container.

8. The apparatus as recited in claim 6, wherein a suction wand is provided at an end of the suction hose which is removed from the vacuum storage container.

9. The apparatus as recited in claim 6, wherein a vessel float is provided in the material receiving section, and the vessel float communicates with the grinding pump to turn the grinding pump on and off.

10. The apparatus as recited in claim 6, wherein a check valve is provided in the disposal line to eliminate back flush into the grinding pump and the vacuum storage container.

11. A method for removing large particles from a vessel, the method comprising:

vacuuming the particles into a vacuum storage container;

pulverizing the particles in a grinding pump in the vacuum storage container;

discharging the pulverized particles though a disposal line extending from the grinding pump through the vacuum storage container;

controlling the operation of the grinding pump with a vessel float, wherein the vessel float communicates with the grinding pump to turn the grinding pump on and off;

wherein the vessel float is movable between a first lowered position and a second raised position such that when the vessel float is in the first lowered position, the vessel float cooperates with the grinding pump to place the grinding pump in an off position and when the vessel float is moved to the second raised position, the vessel float cooperates with the grinding pump to place the grinding pump in an on position; and flushing a suction hose that extends from the vacuum storage container using a fitting, the fitting comprising:

a perforated portion extending between a first end portion and a second end portion; the perforated portion having an inner side wall and outer wall spaced from the inner side wall, a fluid receiving cavity extending between the inner side wall and the outer wall, the inner side wall defining a material flow passageway; and openings provided in the inner side wall of the perforated portion, the openings having ends which open into the fluid receiving cavity.

12. The method as recited in claim 11, wherein a suction wand is provided at an end of the suction hose which is removed from the vacuum storage container.

13. The method as recited in claim 12, further comprising: further flushing the vacuum storage container, the grinding pump and the disposal line to clear any material restrictions.

14. The method as recited in claim 13, further comprising: preventing back flush of liquid into the grinding pump with a check valve.

15. The method as recited in claim 11, the fitting further comprising:

a port extending through the outer wall and into the fluid receiving cavity; and a fluid delivery mechanism for delivering pressurized fluid to the port.

16. The method as recited in claim 15, wherein the fitting is positioned on the suction wand of the suction hose.

17. A method for removing large particles from a vessel, the method comprising:

vacuuming the particles into a vacuum storage container;

pulverizing the particles in a grinding pump in the vacuum storage container;

discharging the pulverized particles though a disposal line extending from the grinding pump through the vacuum storage container; and flushing a suction hose, the vacuum storage container, the grinding pump and the disposal line to clear any material restrictions; wherein the suction hose extends from the vacuum storage container, and a suction wand is provided at an end of the suction hose which is removed from the vacuum storage container;

wherein the flushing is done using a fitting, the fitting comprising:

a perforated portion extending between a first end portion and a second end portion;

the perforated portion having an inner side wall and outer wall spaced from the inner side wall, a fluid receiving cavity extending between the inner side wall and the outer wall, the inner side wall defining a material flow passageway;

openings provided in the inner side wall of the perforated portion, the openings having ends which open into the fluid receiving cavity;

a port extending through the outer wall and into the fluid receiving cavity; and a fluid delivery mechanism for delivering pressurized fluid to the port.

18. The method as recited in claim 17, wherein the fitting is positioned on the suction wand of the suction hose.

19. The method as recited in claim 17, further comprising preventing back flush of liquid into the grinding pump with a check valve.

20. The method as recited in claim 17, further comprising controlling the operation of the grinding pump with a vessel float, wherein the vessel float communicates with the grinding pump to turn the grinding pump on and off.

\* \* \* \* \*